May 20, 1952 — G. R. DOUGLAS — 2,597,077
CONTROL SYSTEM
Filed Nov. 14, 1947 — 2 SHEETS—SHEET 1

Fig. 1a.

WITNESSES:
Robert C. Baird
E. F. Oberheim

INVENTOR
George R. Douglas.
BY
Paul E. Friedemann
ATTORNEY

May 20, 1952     G. R. DOUGLAS     2,597,077
CONTROL SYSTEM Filed Nov. 14, 1947     2 SHEETS—SHEET 2

Fig. 1b.

WITNESSES:
Robert C. Baird
E. H. Oberhein

INVENTOR
George R. Douglas.
BY
Paul E. Friedemann
ATTORNEY

Patented May 20, 1952

2,597,077

UNITED STATES PATENT OFFICE 2,597,077

CONTROL SYSTEM

George R. Douglas, Pittsburgh, Pa., assignor to Westinghouse Electric Corporation, East Pittsburgh, Pa., a corporation of Pennsylvania Application November 14, 1947, Serial No. 785,987

22 Claims. (Cl. 244—77)

This invention relates generally to systems of control and more particularly to control systems applicable in the control of conveyances operable in space.

The present invention is herein illustrated and described as applied in the control of a conventional aircraft utilizing rudders, elevators and ailerons, respectively, for controlling the craft directionally, longitudinally and laterally about the turn, pitch and roll axes thereof. However, it will be appreciated that the control apparatus herein disclosed may be applied to other types of craft utilizing means other than the control surfaces mentioned for effecting maneuverability.

In certain of its aspects this invention is related to a copending application of I. M. Holliday, G. R. Douglas and C. R. Hanna, Serial No. 785,984, filed on the same date as this application, entitled Control Apparatus, and assigned to the same assignee as this invention.

In certain other of its aspects this invention is related to a copending application of C. R. Hanna, Serial No. 785,983, filed on the same date as this application, entitled Control Systems, and assigned to the same assignee as this invention.

The copending application of C. R. Hanna, Serial No. 785,983, is directed to an automatic pilot for aircraft which is controlled by three velocity type gyroscopes, each of which is disposed on the aircraft to respond to rates of motion of the craft about one of its three principal control axes, so that each of the rudders, ailerons and elevators of the craft are controlled in dependence of velocity errors about the corresponding control axis. Additionally the control sections of the system for each of the rudders, ailerons and elevators are so interrelated as to afford coordination of control surface movement for the purpose of maintaining the craft in equilibrium in various attitudes of flight and the entire system is under the control of a suitable piloting means manipulatable by the human pilot.

Velocity type gyroscopes are inherently highly sensitive and, hence, respond to very low angular rates of motion of the craft about its control axes, producing a control which anticipates impending position changes and minimizes excursions of the craft in unwanted directions. But the velocity type gyroscope in itself is insensitive to position errors and, although the gyroscopes have a very low threshold of response to velocity errors and, therefore, position errors as a rule accumulate only over relatively long periods of time, it is usually desirable that a control of this type shall have a position sense affording corrections also in dependence of angular errors in position.

To this end in the above-mentioned system of the application of C. R. Hanna, Serial No. 785,983, suitable means are provided to impart directivity to the three velocity type gyroscopes affording position references therefor in yaw, roll and pitch of the craft and it is to a particular way of imparting a directional sense in azimuth and the control details therefor in the system of control, that the present invention is directed.

Accordingly it is one object of this invention to provide a system of control for a body operable in space which is simple with respect to operational requirements and positive in operation.

Another object of this invention is to provide a system of control for a body operable in space affording a control of the body in yaw both in dependence of yaw velocity and position.

A further object of this invention is to provide a system of control of the character referred to in which the position control may be made sufficiently low in magnitude that marked corrections in dependence of the position control need not occur.

A specific object of this invention is to provide a control system for a body operable in space having a velocity sense for detecting angular rates of the body about given control axes in which a course control unit sensitive to position errors of the body in azimuth supplements the velocity sense in azimuth.

Further to the preceding object it is also an object of this invention to provide means for effectively disconnecting the course control unit from the control system during the execution of maneuvers by the human pilot.

Additionally it is an object of this invention to provide a course control unit of the character referred to which functions as a repeater of the position of the aircraft during turns and is properly oriented for the new course upon completion of the turn.

And in this connection it is specifically an object of this invention to provide a course control unit embodying a synchro control unit operable as a synchro repeater during turning of the aircraft in which a directivity sense is imparted to the rotor obviating the possibility of out of phase synchronizing.

The foregoing statements are illustrative of the various aims and objects of this invention. Other objects and advantages will become apparent upon a study of the following specification when considered in conjunction with the accompanying drawings in which Figs. 1a and 1b together schematically illustrate a system of control embodying the principles of this invention.

Figure 1A:
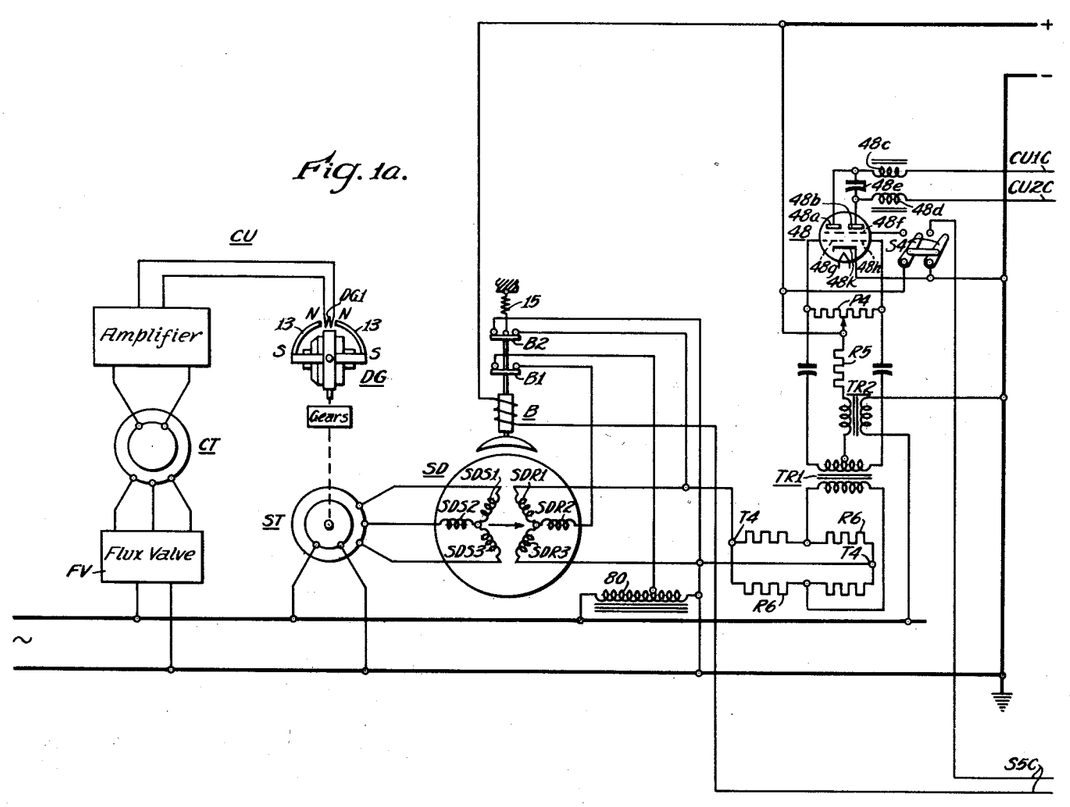
Figure 1B:
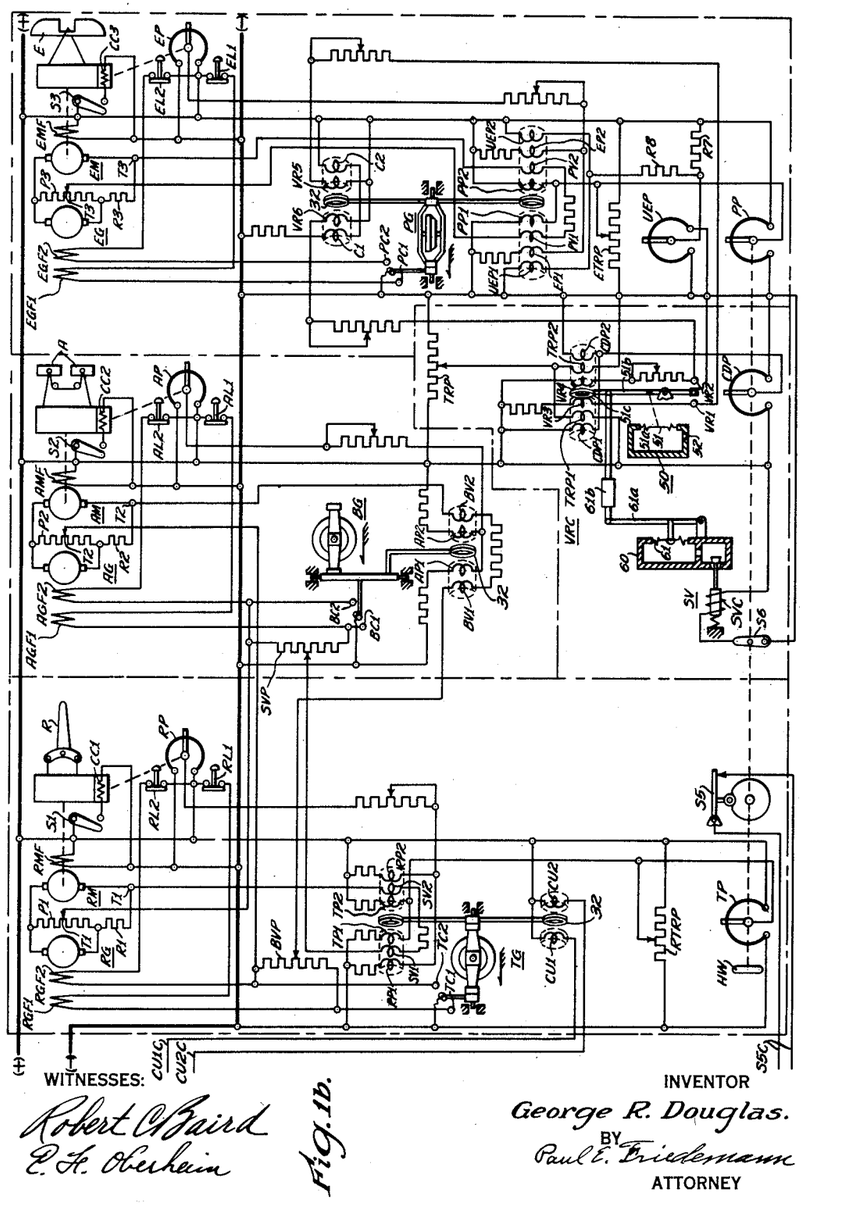

The system illustrated in the drawings embodies the rate gyroscopes previously mentioned. One, a turn rate gyroscope TG controls a servo system including the rudder generator RG and the rudder motor RM which drives the rudder R of the aircraft. The second, a bank or roll rate gyroscope BG controls a servo system including the aileron generator AG and aileron motor AM which drives the ailerons A; and the third, a pitch rate gyroscope PG controls a servo system including the elevator generator EG and the elevator motor EM which drives the elevators E. Each gyroscope is oriented in the aircraft to respond to the rate of motion thereof about the corresponding control axis, the direction of flight being indicated by the arrow adjacent each gyroscope and the gyroscopes appearing as viewed from the side of the aircraft, that is, in elevation. A detailed discussion of the gyroscopes is given in the copending application of C. R. Hanna, Serial No. 785,983, which is above identified, and only such details are hereinafter presented as are deemed essential to an understanding of this invention.

As illustrated each gyroscope has freedom for gyroscopic response about a single axis, otherwise the gyroscope is secured to the aircraft. Thus it will be observed that the turn gyroscope is sensitive only to angular motion about the turn axis of the aircraft, the turn axis lying in the plane of the drawings and being perpendicular to the axis about which the turn gyroscope is pivoted, which axis constitutes the output or precession axis of the turn gyroscope. The pitch gyroscope PG is similarly disposed, its output or precession axis being perpendicular to the pitch axis of the aircraft which is a line perpendicular to the plane of the drawings. The same applies to the bank gyroscope BG having its axis of freedom disposed at a right angle to the roll or bank axis of the aircraft which is a horizontal line in the plane of the drawings. In each case it will be observed that a rate of motion of the aircraft about any one of the turn, roll or pitch axes, applies a torque to the corresponding gyroscope tending to angularly displace the spin axis thereof. Accordingly, each gyroscope, having a degree angular freedom about an output axis at right angles to the axis of the applied torque, produces an output torque representative of the input velocity, and the output torque is herein utilized to produce suitable control quantities for operating the associated servo system.

There are several ways in which the gyroscope output torques may be utilized to produce electrical quantities. For instance, the torque may be applied through a mechanical linkage to a carbon pile unit or other type of variable resistance unit to control the resistance thereof. One such variable resistance unit appears in a copending application of C. R. Hanna and K. A. Oplinger, Serial No. 785,985, filed on the same date as this application, entitled Control Systems, and assigned to the same assignee as this invention.

The present embodiment utilizes a contact set comprising a pair of opposed stationary contacts having a movable contact disposed therebetween and which is secured to the gyroscope radially of the output axis thereof. Thus, in the case of the turn gyroscope precessional motion selectively engages the movable contact with either of contacts TC1 or TC2 which are, respectively, connected in series with one of a pair of differentially related field windings RGF1 and RGF2 on the rudder generator RG. The circuit for the field RGF1 extends from the positive conductor (+) through limit switch RL1 controlled by the rudder potentiometer RP, through the field RGF1 to contact TC1 and thence to the movable contact and the negative conductor (−). Similarly the circuit for field RGF2 extends from the positive conductor (+) through limit switch RL2 actuated by the rudder potentiometer RP, through field RGF2 to contact TC2 and thence to the movable contact and the negative conductor (−). The bank and pitch gyroscope contact circuits are the same as that of the turn gyroscope, aileron generator field AGF1 being connected in series with limit switch AL1 actuated by the aileron potentiometer AP and bank contact set BC1 across the power supply and field AGF2 being connected in series with limit switch AL2 and bank contact set BC2 across the power supply. Similarly elevator generator field EGF1 is connected in series with limit switch EL1 actuated by elevator potentiometer EP and the pitch contact set PC1 and field EGF2 is in series with limit switch EL2 and pitch contact set PC2, both series circuits being connected across the power supply.

The function of the gyroscope contacts in controlling the excitation of the field circuits of the generators is not alone simply that of making and braking the circuit to the selected field but also that of controlling the current magnitudes in these circuits. This is accomplished by controlling the contacts so that hovering operation obtains in dependence of gyroscope output torques, suitable electromagnetic biases about the output axis of each gyroscope, and a degree of dynamic unbalance in the rotating system of the respective gyroscopes. By this means average currents are caused to flow in the field circuits corresponding to the detected error velocity about the corresponding control axis of the aircraft or corresponding to a set in turn rate at the handwheel HW.

The mentioned electromagnetic biases are produced by sets of electromagnets having armatures secured to the respective gyroscopes radially of their output axes. The specific structure of the electromagnets is not illustrated but reference may be had to the mentioned application of C. R. Hanna for these details. Generally the electromagnets are designed with overlapping cores and armatures so that appreciable changes in air gaps with armature movement do not occur over the limited range of armature motion so that the magnet force is independent of the armature position with respect to the magnet core, minimizing negative stiffness. Each magnet comprises a cylindrical core (not shown) having one extremity thereof projecting beyond the coil or coils wound thereabout. In the magnet systems shown in the drawings, the cores are disposed in opposed relation and an annulus 32 of magnetic material secured to the associated gyroscope as previously described surrounds the core structures at the air gap formed between the confronting extremities of the cores. The axial length of the armature is sufficient that overlapping of the cores thereby exists throughout the limited range of armature motion.

The electromagnetic biases are produced by feedback voltages and control voltages applied to the respective coils of the magnets. The precessional response of each gyroscope is damped by a feedback voltage representative of the velocity of operation of the motor of the corresponding servo system. To this end each motor is connected as one leg in a bridge circuit which is balanced against the resistance of the motor armature. Thus when the motors drive the corresponding control surfaces to equilibrium position and come to a stop, the currents circulating in the bridge circuits are balanced and the output voltage of each bridge is zero. However, during rotation the back E. M. F. of the respective motors increases the apparent armature resistance unbalancing the bridge circuit and producing an output voltage. Inasmuch as the motor fields RMF, AMF and EMF for the rudder motor, the aileron motor and the elevator motor are maintained at constant voltage across the power supply, the back E. M. F. varies in magnitude and direction with the motor speed and direction of rotation producing a velocity voltage across the output terminals of each bridge circuit. The bridge circuit for the rudder motor includes a potentiometer P1 of which the tapped portions form adjacent legs and the remaining adjacent legs are formed by the resistor R1 and the armature winding of the rudder motor. Generator RG is connected across potentiometer P1 the extremities of which form the bridge circuit input terminals while terminals T1 formed by the tap of potentiometer P1 and the point between resistor R1 and the motor armature winding constitute the output terminals. The armature winding of aileron motor AM likewise forms one leg of a bridge circuit energized by generator AG and including a potentiometer P2 and a resistor R2, the output terminals being designated T2. Similarly the armature winding of the elevator motor EM forms one leg of the bridge including potentiometer P3 and resistor R3 which is energized by generator EG and has for its output terminals the terminals T3. In each instance, the velocity voltage taken from the respective bridge circuits is fed back in a negative sense, that is the electromagnetic bias resulting from the velocity feedback voltage opposes the precessional response of the corresponding gyroscope.

A second feedback voltage for each gyroscope is taken respectively from the potentiometers RP, AP and EP the movable taps of which are driven by the corresponding servo systems through electromagnetically operated clutches having coils CC1, CC2 and CC3 which are respectively energized from the power supply upon closure of switches S1, S2 and S3. Since the potentiometers are each actuated by a motor driving a control surface of the aircraft, the position of each movable tap and hence the tapped voltage corresponds to the position of the associated control surface, thus the response of each gyroscope is also controlled in dependence of control surface position.

In order to obtain coordination of control surface movement during the execution of turns, the turn and bank gyroscopes, TG and BG are additionally biased by voltages taken, respectively, from a skid voltage potentiometer SVP and a bank voltage potentiometer BVP, which are respectively connected in the field circuits of the aileron and rudder generators to be energized in dependence of the currents circulating therein when a set of the associated gyroscope's contacts is closed. For instance, regarding the skid voltage potentiometer SVP, when the contact BC1 is engaged by the movable contact actuated by gyroscope BG to energize field AGF1, a circuit for energizing skid voltage potentiometer SVP is completed beginning with the positive conductor (+) and including limit switch AL2, generator field AGF2, potentiometer SVP, contact BC1 and the movable contact engaged therewith to the negative conductor (−). Engagement of the movable contact with the other stationary contact BC2 energizes the potentiometer SVP in a reverse direction in a circuit including the generator field AGF1 and limit switch AL1. Analogous considerations apply to the bank voltage potentiometer BVP. Thus upon the operation of either of the bank or turn gyroscopes to control the associated control surface the other gyroscope is biased in a direction to effect coordinated application of its control surface.

The turn and pitch gyroscopes are additionally biased by voltages obtained from potentiometers controlled by handwheel HW under the control of the pilot. In the rudder section of the system the potentiometer is designated TP while in the elevator section the potentiometer is designated UEP. These potentiometers are controlled by rotational motion of the handwheel, the turn potentiometer TP producing voltages of reversed polarity upon motion of the movable tap from one side to the other of mid or neutral position while the up-elevator potentiometer UEP produces unidirectional voltages on either side of its midpoint position. Thus the biasing effect on the pitch gyroscope is unidirectional to produce up-elevator for either direction of rotation of the handwheel and bank of the aircraft to compensate for the reduction in loss of horizontal lifting surface of the main wing during banking, by increasing the angle of attack thereof. Additionally it has been found that the required amount of up-elevator varies substantially as the square of the angle of bank. Thus by applying suitable biasing effects to the electromagnets of the turn and bank gyroscopes to obtain linear response, the application of a square law bias to the pitch gyroscope produces the required degree of up-elevator application for the turn rate set in at the handwheel. In the present instance the square law bias is obtained by utilizing a potentiometer UEP of sufficiently high ohmic value with respect to the resistance of the coils to which it is connected that a flat response over the middle or neutral range of the potentiometer obtains producing coil biasing voltages approximating a square law.

The pitch rate gyroscope is additionally biased by voltages taken from a pitch potentiometer PP. This potentiometer is actuated by push-pull motion of the handwheel affording reversed polarity biasing voltages when the movable tap is moved to opposite sides of neutral position, dives and climbs being executed by push-pull motion of the handwheel.

Directivity is imparted to all three gyroscopes. In the case of the bank gyro this is accomplished by making the gyroscope pendulous about its vertical output axis as illustrated. Thus this gyroscope in addition to responding to rates of motion about the roll axis is also sensitive to lateral acceleration and gravity, tending to assume a position about the vertical output axis thereof corresponding to the resultant of these two quantities. As a consequence the reference position for which this gyroscope initiates rolling motion of the craft corresponds to the proper angle of bank for the actual turn velocity of the craft.

In the case of the pitch gyroscope directivity is obtained from the vertical rate control VRC which produces biasing voltages in dependence of the rate of change of altitude and actual displacements in altitude. The vertical rate control includes a structure 50 having an opening therein forming a chamber which is sealed by a flexible diaphragm assembly including diaphragm 51 supported by a flexible annulus 51a. A small orifice 52 affords communication of the chamber with the atmosphere and diaphragm 51 is, therefore, displaced to the left or right as viewed with a force depending upon the rate of movement of the assembly vertically in the atmosphere. Diaphragm 51 is connected with pivoted arm 51b carrying a movable contact at its lower extremity and an armature of an electromagnet assembly at its remaining extremity. The movable contact is disposed between a set of stationary contacts VR1 and VR2 which under the influence of the biasing control of the electromagnet associated therewith are caused to hover during operation. The vertical position reference is provided by the structure including the chamber 60 sealed by diaphragm 61 the motion of which is transmitted to arm 51b by link system 61a and loaded spring assembly 61b, the details of which are not shown, being well known in the art and thus also influences contact operation.

The vertical rate control electromagnet assembly is energized by a drive and climb potentiometer CDP actuated by push-pull motion of handwheel HW. This potentiometer is connected in a bridge circuit with the pair of coils CDP1 and CDP2 in which the tapped portions of the potentiometer form one pair of adjacent legs and coils CDP1 and CDP2 form the remaining pair of adjacent legs. The bridge circuit is connected across the positive and negative conductors and the movable tap of the potentiometer CDP is connected between the coils. Thus motion of the potentiometer tap to either side of center position correspondingly unbalances the coil currents and the armature is biased accordingly to cause engagement of the movable contact with one or the other of contacts VR1 and VR2. Contacts VR1 and VR2 are respectively connected in series with coils VR3 and VR4 of the vertical rate electromagnet. The arrangement is such that closure of a contact energizes the corresponding coil tending to open the contact producing a hovering contact motion in which the electromagnetic biases balance the mechanical biases on arm 51b. The remaining pair of coils TRP1 and TRP2 form adjacent legs of a bridge including the trim potentiometer TRP which is adjustable to compensate off-center conditions. During periods of climbing or diving of the aircraft initiated by pulling or pushing of the handwheel switch S6 operated by push-pull handwheel motion deenergizes solenoid valve SV which is spring biased open and provides communication of chamber 60 with the atmosphere.

In the case of the turn gyroscope directivity is obtained from the course control unit CU which will be described in detail hereinafter. This unit produces biasing voltages in dependence of the error in heading of the aircraft.

Summing up the foregoing electromagnetic biases on the individual gyroscopes, the turn rate gyroscope electromagnet assembly is controlled by a rudder motor velocity voltage, a rudder position voltage, a skid voltage from the aileron section of the system, a piloting voltage from the turn potentiometer and a course error voltage.

The bank rate gyroscope electromagnet assembly is controlled by an aileron motor velocity voltage, an aileron position voltage and a bank voltage from the rudder section of the system.

The pitch rate gyroscope electromagnet assembly is controlled by an elevator motor velocity voltage, an elevator position voltage, a piloting voltage from the up-elevator potentiometer UEP, a piloting voltage from the pitch potentiometer PP and a combined vertical rate and vertical position voltage from the vertical rate control.

These biasing voltages for the three gyroscopes are applied in any operating order and in various magnitudes depending upon the control requirements of the specific operating condition and the circuit connections are as follows:

Considering the turn gyroscope electromagnet system the velocity feedback voltage taken from terminals T1 and the skid voltage taken from potentiometer SVP are added in series in a circuit extending from terminals T1 at the movable tap of potentiometer SVP to the tap thereof through coils SV1 and SV2 to the other terminal T1. These voltages produce opposed torques about the gyroscope output axis. The rudder position feedback voltage is applied by the connection of the rudder potentiometer RP in a bridge circuit with coils RP1 and RP2 so that movement of the tap of the rudder potentiometer unbalances the coil currents. The piloting voltage is applied by connecting the turn potentiometer in a bridge circuit with coils TP1 and TP2 similar to the rudder potentiometer and means for trimming this circuit for off-balance conditions is had in the rudder trim potentiometer RTRP, the movable tap of which adjusts the currents in coils TP1 and TP2 when potentiometer TP is centered to compensate for off-center conditions. The course error voltage is applied to coils CU1 and CU2 which produce balanced torques when the craft is on course. While the magnetic effects of coils SV1 and SV2 produce opposed torques about the gyroscope axis due to the fact that they are arranged on oppositely disposed cores, for a given control condition, the M. M. F. of one of these coils always opposes, for instance, that of one of the coils RP1 or RP2 because the M. M. F.'s of coils RP1 and RP2 are opposed. Thus the polarizing effect of such coils as RP1 and RP2 effects unbalance of magnet forces and hence, an unbalance of torques about the turn gyroscope output axis due to the velocity feedback voltage.

In the bank gyroscope electromagnet system, the velocity voltage and the bank voltage taken respectively from the pair of bridge circuit terminals T2 and the bank voltage potentiometer BVP are added in series in a circuit including a pair of coils BV1 and BV2. This circuit corresponds to its counterpart in the rudder section of the system. The aileron position voltage is applied by the connection of the aileron potentiometer AP in a bridge circuit with coils AP1 and AP2 in which the movable tap on AP unbalances the coil currents. The M. M. F.'s of the two pair of coils are related the same as those of the coils SV1, SV2 and RP1, RP2.

In the pitch gyroscope electromagnet system the velocity voltage is applied to coils PV1 and PV2 which are connected in series across the terminals T3 of the elevator motor bridge circuit and the elevator position voltage is applied by means of a bridge circuit in which the tapped portions of potentiometer EP form adjacent legs and a pair of coils EP1 and EP2 form the remaining two adjacent legs, the movable tap of EP being connected between the coils EP1 and EP2 to control the current distribution between the coils. Here again the M. M. F.'s of the coils PV1 and PV2 are in the same direction while the M. M. F.'s of the coils EP1 and EP2 are opposed. Thus for one polarity of terminals T3 the M. M. F. of coil PV2, for instance opposes that of coil EP2 while the M. M. F. of coil PV2 aids that of coil EP1. When the velocity voltage is reversed and the polarity of terminals T3 is reversed, the M. M. F. of coil PV1 opposes that of coil EP1 while that of coil PV2 aids that of coil EP2. The piloting voltage from the up-elevator potentiometer UEP is applied in a bridge circuit. In this circuit the up-elevator potentiometer forms one leg, having its extremities connected together to form a common terminal. Thus the tapped portions of the potentiometer form parallel resistance branches in the bridge leg in which movement of the movable tap to either side of center position decreases the resistance of the leg to unbalance the bridge circuit. The adjacent leg of the bridge is formed by resistor R7 while the remaining two legs are formed by coils UEP1 and UEP2 and resistor R8 is connected on one side to a point between the pair of coils UEP1 and UEP2 and on its other side to a point between resistor R7 and potentiometer UEP. As previously noted the resistance of the potentiometer is sufficient with respect to the resistance of the coils to provide a flatness of response over the balance point approximating a square-law function to afford the desired up-elevator application for the system. The piloting voltage from the pitch potentiometer is applied by means of a bridge circuit including the tapped portions of pitch potentiometer PP as adjacent legs and the pair of coils PP1 and PP2 as the remaining adjacent legs, the movable tap of potentiometer PP being connected between the coils PP1 and PP2 controls the current distribution in these coils. The vertical rate and vertical position quantity of the vertical rate control VRC is applied to coils VR5 and VR6. These coils are respectively connected in series with contacts VR1 and VR2 and one coil or the other is energized depending upon which of contacts VR1 and VR2 is engaged by the movable contact associated therewith. Since a linear response is here desired a pair of biasing coils C1 and C2 are applied to the cores carrying the coils VR5 and VR6, coil C1 being on a core with coil VR5 and coil C2 being on a core with coil VR6. Coils C1 and C2 are arranged in series in a circuit across the power supply and produce opposed magnetic forces. The magnetic biasing effect of these coils with respect to coils VR5 and VR6 is such as to produce a linear magnet response to the current of coils VR5 and VR6.

Thus it will be observed that the hovering operation of the contacts controlled by the gyroscopes as hereinbefore noted is influenced in each case by a multiplicity of electromagnetic biases which operate in varying degree and at various intervals to produce the required biasing effect on the gyroscopes of the system and, if desired, contact hovering may be augmented by introducing torsional vibration about the output axis of each gyroscope. In the instant case torsional vibration is produced by dynamically unbalancing the rotor system of each gyroscope.

The directivity signal for the turn gyroscope which is taken from the course control unit CU originates in a device commonly known as a flux valve FV responsive to the earth's magnetic field. The flux valve is a well known device and in the interest of simplicity is not detailed. Generally it includes three magnetic members displaced by 120° and the assembly is pendulously mounted in a suitable location in the aircraft to be maintained in a horizontal plane within the angular range of freedom afforded by its pendulous mounting. The three magnetic members form a core structure of Y-shaped configuration which is built up of laminations of magnetic material, the laminated assembly being separated at the junction of the arms of the Y-shaped core to straddle an exciting coil of annular form in which the coil axis is vertically disposed. Each arm of the core of the flux valve carries a winding linked by the flux of the exciting coil. The relative magnitudes of exciting flux and cross sectional core area at the junction of the core arms is selected so that saturation of the core occurs with each alternation of the flux, producing a condition in the assembly in which the center section of the core functions effectively as a flux valve. When the flux valve is horizontally disposed the permeability of the three magnetic members is altered by the horizontal component of the earth's magnetic field. Upon excitation of the exciting coil or winding with a single phase alternating current as indicated in the drawings by the sinusoidal wave there is produced in the three secondary windings of the magnetic members a set of voltages having double the applied frequency and unbalanced magnitudes depending upon the direction of the earth's field and such voltages are similar in every respect to single phase synchro transmitter voltages as the rotor of the synchro is turned.

In developing the output voltage of the flux valve for application to the turn rate gyroscope the three secondary windings of the valve are connected to the stator of a synchro control transformer CT in which the rotor is secured against rotation in a predetermined position. The rotor winding voltage of control transformer CT drives an amplifier of a type similar to that containing tube 48 in which the output of the control transformer CT is compared as to phase with a double frequency voltage synchronized with that of the control transformer output voltage and the output of the amplifier varying in magnitude and direction depending upon the phase error and whether the error is leading or lagging the reference signal, is utilized to energize the coil DG1 which biases the directional gyroscope DG about its horizontal input axis which is normal to the plane of the drawings as viewed.

The directional gyroscope is of the position type, its gimbal mounting affording freedom of angular motion about horizontal and vertical axes with respect to the craft and which constitute the input and output axes, respectively. Thus upon excitation of coil DG1 the polarizing effect of the permanent magnet armature 13 produces a torque about the input axis thereof in a direction corresponding to the polarity of the coil and the gyroscope precesses about its vertical output axis. This precessional response of the directional gyroscope is applied to the rotor of a synchro transmitter ST through a suitable assembly of gears. The rotor winding of device ST is excited by the common supply of alternating current indicated and the stator winding thereof is connected with the stator winding of a synchro differential unit SD which functions selectively as a transformer and a repeater as will be described hereinafter. Two windings of the Y connected rotor winding of synchro unit SD are connected across the input terminals T4 of a normally unbalanced bridge circuit including a pair of resistors R6 in opposite legs and the output terminals of this bridge circuit are connected across the primary winding of a transformer TR1 forming the input circuit to an amplifier including tube 48.

Vacuum tube 48 is provided with a pair of plates connected with the positive side of the source voltage (+), the circuit for plate 48a including choke coil 48c and biasing coil CU2 of the turn gyroscope and the circuit for plate 48b including choke coil 48d and the other biasing coil CU1. Choke coils 48c and 48d together with the shunt connected capacitor 48e form a filter network for the plate circuit tending to provide vibrationless biasing control for the turn gyroscope. Screen grid 48f is connected to the positive side of the supply source through one blade of switch S4. Control grids 48g and 48h are connected across a bridge network including a potentiometer P4 and the secondary winding of transformer TR1 in such a way that the voltages thereof are varied in opposite directions depending upon the voltage across the secondary winding of transformer TR1. The cathode 48k is connected to the negative side of the source completing the power supply circuit for the tube.

A circuit including the secondary winding of transformer TR2 is connected across the remaining two terminals of the bridge circuit, which terminals are formed by a tap on the secondary winding of transformer TR1 and the adjustable tap of potentiometer P4. A constant bias is applied to the control grids 48g and 48h by connection of the movable tap of potentiometer P4 to the positive side (+) of the source, the adjustment being such as to balance the plate currents of the tubes when the error signal is zero and a reference voltage is obtained by connecting the primary winding of transformer TR2 to the source of alternating current indicated, providing equal alternating voltage changes on the grids 48g and 48h. This voltage which is synchronized with the error voltage across the transformer TR1, having its origin in the synchro transformer ST energized from the same source, thus provides a phase reference for the error voltage and the error voltage thus drives one grid more positive as the other is driven less positive affording push-pull operation of tube 48 and coils CU1 and CU2 controlled thereby.

As a rule the range of values of the course error signals from zero error to 180° of error is too great to be conveniently accommodated in the amplifier controlling coils CU1 and CU2 and whsen the amplifier is adjusted for proper response to errors in the vicinity of zero error, the error voltage, for instance, in the neighborhood of 90° predominates the reference voltage and the function of the amplifier deteriorates. Since the correction of the course error need not be proportional to the actual error, and, in fact, is preferably made sufficiently small that course error corrections are not readily noticeable, means are herein provided to prevent the error voltage applied to the amplifier from increasing at the rate the course error signal increases.

This is accomplished in the provision of resistors R6 in the normally unbalanced bridge circuit supplied by the rotor winding of synchro differential unit SD. These resistors are of a type in which the resistance thereof to a flow of current decreases as the voltage applied thereacross increases. The bridge circuit is normally unbalanced by the predominating resistance of resistors R6 which are connected in opposite legs of the bridge. Hence as the voltage applied to the input terminals T4 of the bridge circuit is increased the voltage across resistors R6 is increased causing a reduction in resistance thereof tending to decrease the unbalance of the bridge and reducing the voltage applied to the primary winding of transformer TR1. By this expedient the circuit constants may be chosen so that suitable sensitivity to minor course errors obtains and which functions in effect to suppress the course error signal as the course error increases, that the signal does not exceed the range over which the amplifier is operable.

As thus far described the course control unit functions to produce an error signal representative of the error in heading of the aircraft from a selected course and this signal through the amplifier 48 is applied to the coils CU1 and CU2 to produce the required gyroscopic response and control of the aircraft to move the aircraft and hence the flux valve in azimuth until the error signal drops to zero. As a rule changes in course will be effected by manipulations of the handwheel HW to produce the desired control of the turn gyroscope and turning of the aircraft. However, is desired, changes in course may be made by rotating the rotor of the synchro differential unit SD. Assuming for simplicity that the error signal at the time of rotation of the rotor of the synchro differential is zero, the rotor is moved from its null position and a voltage is induced therein. This set in error signal is, therefore, applied to the turn gyroscope which initiates a control of the craft in azimuth in a direction to re-orient the flux valve so that the transmitted flux pattern appearing in the stator of the synchro units is rotated to correspond to the new position of the rotor thereof at which time the error signal is again zero.

Since the rate at which the aircraft approaches the new course by this latter method is slow because the control effect of the course control unit on the turn gyroscope is ordinarily small, the usual method of making a turn is by means of handwheel HW. During a turn so initiated it is desirable to remove the control effect of the course control unit on the turn gyroscope and at the same time the course unit should be readjusted so that upon completion of the turn it is set to control the plane on the new course. This readjustment of the course control unit is made by re-positioning the rotor of the synchro differential unit SD as the aircraft is turned so that upon completion of the turn the rotor is set in its null position with respect to the flux pattern of the stator winding of the device.

Means for re-positioning the rotor of synchro differential unit SD during manually initiated turns may be of several forms, for instance, a repeater motor may be employed to drive the rotor into correspondence with the flux pattern for the new heading upon completion of the turn. While this is a practical expedient it involves additional equipment adding weight and complications to the control.

A better method is to reconnect the rotor winding of the synchro differential so that this device functions as a repeater motor during manually initiated turns. Broadly such a scheme appears in the mentioned copending application of I. M. Holliday, G. R. Douglas and C. R. Hanna, Serial No. 785,984. However, the present arrangement affords improvements in operation over the control of I. M. Holliday et al. In the course control unit of I. M. Holliday et al., use is made of a single phase synchro control transformer which receives the flux valve signal and applies a course error signal to the course control amplifier. During turns initiated at the handwheel suitable handwheel operated switching means shorts the rotor winding of the single phase synchro and the synchro functions as a repeater motor, following the rotating electrical field of the stator winding thereof tending always to seek the position in which zero voltage is induced in the rotor winding, this position being commonly referred to as the null voltage position. However, such an arrangement introduces the possibility of ambiguity since the single phase rotor winding has two null voltage positions which are 180° apart and there is no recognition of instantaneous polarities in the follow-up action of the rotor assembly. Although the possibility of ambiguity in rotor position is normally encountered only upon initial engagement of the course control unit and the error is readily noted it is necessary at times to re-position the rotor of the synchro control transformer to correct the phase error.

The possibility of out of phase synchronizing during manually initiated turns is eliminated by the use of the synchro differential unit SD and the circuit arrangements herein disclosed. Synchro differential unit SD is essentially a differential synchro device having a Y connected stator winding group comprised of windings SDS1, SDS2 and SDS3 and a Y connected rotor winding group comprised of windings SDR1, SDR2, and SDR3. The stator windings are connected in the usual manner to be supplied by the secondary winding system of the synchro transmitter ST and, hence, the electrical field and resulting flux pattern in the synchro differential unit is rotated in dependence of rotation of the rotor winding of synchro transmitter ST under the control of the flux valve signal. The extremities of rotor windings SDR1 and SDR3 are connected across input terminals T4 of the normally unbalanced bridge circuit. Thus it will be appreciated that course error voltages appearing in the rotor windings SDR1 and SDR3 may be applied across the input terminals T4 to effect a control of the turn gyroscope TG and the craft.

As previously noted the synchro differential functions as a transformer during fixed course operation and as a repeater during turns initiated at the handwheel. The means for accomplishing this includes a solenoid type of brake B having a contact assembly formed by contacts B1 and B2 which are closed when the brake is in released position by a spring 15 and applied by electromagnetic forces, engaging its shoe with the rotor of synchro differential SD. During handwheel initiated turns brake B is controlled by a switch S5 actuated by a cam on the handwheel shaft, the cam being suitably shaped to close switch S5 when centered and opening switch S5 upon motion thereof to either side of center position to initiate a turn. The circuit for the coil of the brake begins at the positive conductor (+) extends through the coil and switch S5 and thence through the right hand blade as viewed of switch S4 to the negative conductor (−). For fixed course operation the handwheel is centered and switch S5 is closed energizing brake B and locking the rotor of synchro differential SD and during handwheel initiated turns S5 is open deenergizing the brake coil and spring 15 biases the brake to released position.

The polarity sense inherent in the rotor circuit of the synchro differential when connected as a repeater results from the application of the alternating current supply common to the system to the distributed rotor winding system of the synchro differential. As a consequence the reference voltage for the synchro differential is synchronized with the energizing voltage of the synchro transmitter ST and due to the distributed pattern of the interlinking fluxes in the synchro differential but one null position for the rotor winding may exist. The voltage applied to the rotor winding of the synchro differential unit is taken from a tapped portion of an auto transformer 80 connected across the alternating current power supply. Contacts B2 short the extremities of rotor windings SDR1 and SDR3 connected across the bridge terminals T4 shunting the bridge from the winding circuit and connecting these shorted winding extremities to one side of the auto transformer, while the third winding SDR2 is connected to the auto transformer tap by contacts B1.

It will be observed that although the rotor winding system of the synchro differential is comprised of a polycircuit represented in the three rotor windings, single phase excitation is applied to the differential synchro both when functioning as a transformer and when functioning as a repeater. However, unlike the usual single phase synchro unit the flux pattern of the rotor is distributed in the same manner as that of the stator during repeater operation and, hence, as above noted the polarity sense afforded upon energization of the rotor winding in the manner illustrated results in only one null position.

This will be apparent from a brief consideration of the electromagnetic properties of the synchro differential. Assuming for the purposes of the following considerations that the stator magnetic field is resolvable into a horizontally disposed component directed to the right as shown by the arrow, during periods of fixed course operation when brake B is energized locking the rotor and disconnecting the rotor winding system from the source voltage, rotor windings SDR1 and SDR3 are equally linked by the flux resultant of the stator field producing equal and opposite voltages in the rotor winding circuit, resulting in zero voltage across the input terminals of the bridge circuit of the course unit amplifier. This corresponds to the condition when the craft is directly on course. However, should the craft be off course in one direction the flux valve signal is angularly displaced and through the intermediate elements rotates the rotor of synchro transmitter to correspondingly shift the electrical field and hence the field flux of the differential unit. Assuming the shift is clockwise, as viewed, the rotor windings SDR1 and SDR3 are now linked in different amounts, the voltage in winding SDR1 increasing as that of winding SDR3 decreases, since the flux resultant is approaching a parallel relation with the axis of winding SDR1 and a quadrature relation with the axis of winding SDR3. The resulting differential voltage represents the course error. Upon continued rotation of the flux resultant in the assumed clockwise direction beyond the quadrature relation thereof with the axis of winding SDR3 the flux linkage of SDR3 reverses and the voltage thereof is now of the same instantaneous polarity as that of winding SDR1.

The magnetic field produced by the rotor winding system when connected as illustrated to the auto transformer 80 and the source voltage corresponds in all respects to that of the associated stator winding system and is resolvable into a single component of flux oriented in dependence of the instantaneous condition of excitation. Since this field is the result of single phase excitation the same as that of the stator winding system the instantaneous fluxes due to the single phase excitation are of corresponding pattern and the null position of the rotor corresponds to the position in which the flux resultants of the stator and rotor winding systems are aligned, which rotor position is the same physically as the null position of the rotor during transformer operation. As the turn is made and the rotor of the synchro transmitter rotated due to the flux valve signal, the flux resultant of the stator winding system of the synchro differential rotates and the rotor thereof follows the rotating stator field. Since each of the stator and rotor of the synchro differential has but one flux resultant due to the single phase excitation thereof it will be appreciated that there can be but one synchronizing position for the rotor.

The operation of the system as a whole is substantially as follows. As a rule control of the aircraft during take-off is done under the manual control of the pilot. Once the plane is flying at the proper altitude on the selected course, the control is switched over to the auto pilot for fixed course control. In accomplishing this, the gyroscopes are brought up to operating speed after which the source voltage may be applied and switches S1, S2 and S3 closed to connect up the drives for the potentiometer RP, AP and EP, respectively. Brake B remains deenergized, however, until switch S4 is closed, the coil circuit therefor being broken through the right hand blade, as viewed, of S4. Thus at this instant the rotor winding circuit for the synchro differential unit SD is closed through the contacts B1 and B2 and the rotor position is synchronized with the voltage or flux pattern of the stator winding thereof transmitted from the flux valve to the mentioned stator winding through the intermediate system elements, which properly orients the rotor for zero voltage output for the selected course. Closure of switch S4 energizes the coil of brake B applying the brake to lock the rotor and removing the energizing circuits for the rotor winding of unit SD at which time a rotor signal voltage may be applied across the input to the amplifier.

The system now functions to maintain the aircraft on the selected course and to this end velocities of motion about any of the three control axes are instantly detected by the gyroscopes. Yawing velocities produce output torques at the turn gyroscope in directions which produce servo-mechanism operation to apply the rudder so as to produce opposite yaw velocities. During this interval the velocity feedback voltage and the rudder potentiometer voltage produce electromagnetic biasing torques at the gyroscope which oppose the precessional torque. The hovering contact condition which results produces an average current in the field of the rudder generator causing rudder movement at a predetermined rate which is a function of the velocity disturbance about the yaw axis. As rudder movement increases the electromagnetic bias increases, the velocity disturbance decreases and the gyro output torque decreases reducing the output current. At equilibrium the electromagnetic bias opposes and balances the gyro torque output at which point the motor stops and just sufficient current is circulated to maintain the required torque of the motor. At this point the velocity feedback voltage is zero since the bridge circuit of the motor generator system is balanced. The rudder correction is now maintained for that small interval of time necessary to check the velocity disturbance at which time the gyroscopic response drops to zero with the velocity disturbance and the overbalancing electromagnetic bias produces a reversal of the servo-mechanism causing reverse rudder movement to neutral position. The function of the system in the reverse direction is essentially the same. Cumulative errors in course are detected by the direction indicator or flux valve and the error signal voltage applied to the input of the amplifier unbalances the currents circulating in coils CU1 and CU2. The unbalance torque about the output or precession axis of the turn gyroscope influences operation of the servo-mechanism for the rudder in a direction to correct the course error. While the course correction illustrated is continuous, it may of course be applied only at intervals to correct the slight cumulative course error.

Operation of the turn gyroscope produces voltages across the bank voltage potentiometer BVP which are applied to coils BV1 and BV2 of the bank gyroscope electromagnet system. Thus upon application of the rudder to check velocities of movement about the turn axis the bank gyroscope is controlled to produce aileron servo-mechanism in a direction to apply the ailerons in correspondence with the rudder position or direction of movement. This introduces a velocity about the roll axis which is detected by the roll gyroscope which produces an output torque opposing the bank voltage bias and the velocity feedback voltage of the aileron servo system which now supplements the bank voltage signal. As the ailerons are displaced another electromagnetic bias appears which aids the bank voltage and velocity feedback bias. This bias is the result of operation of the aileron potentiometer AP which controls the excitation of coils AP1 and AP2. Equilibrium of the ailerons results when the potentiometer AP is suitably displaced to balance the magnetic torques against the gyroscopic and pendulous torques of the bank gyroscope. When equilibrium in the bank angle is reached the pendulous response of the bank gyroscope produces torques about the output axis thereof tending to center the bank gyroscope and return the ailerons to streamlined position.

Operation of the bank gyroscope produces a voltage across the skid voltage potentiometer SVP which is applied in series with the velocity feedback voltage of the rudder servo system to the coils SV1 and SV2 of the turn gyroscope electromagnet system. This voltage tends to hold back or suppress rudder application and since the skid voltage diminishes with accumulated bank angle premature rudder application is minimized. The magnitude of the skid voltage signal may be selected to provide any practical degree of control of rudder motion. In certain instances it has been found possible to dispense entering with the skid voltage signal.

Turns may be executed by the simple expedient of rotating handwheel HW displacing the movable taps of both potentiometers TP and UEP and producing a coordinated unbalance of the electromagnetic biases of the pairs of coils TP1, TP2 and UEP1, UEP2. The magnetic torques thus produced cause operation of the pitch bank and turn gyroscopes in a suitable direction to effect, for example, right rudder application, aileron application for a bank to the right and up-elevator corresponding in amount to the right rudder application. The gyroscope torques oppose the electromagnetic biases as previously described producing the hovering contact condition and average excitation currents for the aileron, elevator and rudder generator fields. Switch S5 is opened by the cam driven by the handwheel and deenergizes the brake B. Simultaneously therewith the rotor of the synchro differential unit SD is unlocked. Thus the rotor circuit is energized and the synchro differential unit functions as a repeater of the changing course of the aircraft in the turn.

The up-elevator signal on the pitch gyroscope causes up-elevator application to provide the proper pitch velocity for the turn indicated by handwheel rotation. This control is supplemented by the control of the vertical rate system which senses rates of change in altitude as well as displacements. Thus if the asked for pitch velocity set in by the up-elevator potentiometer for any reason results in a climb or a dive in the turn, the biasing effect of the vertical rate system on the pitch gyroscope tends to modify the pitch signal to coordinate the pitch velocity with the bank angle and turn rate.

The foregoing disclosure and the showing made in the drawings are merely illustrative of the principles of this invention and are not to be interpreted in a limiting sense. The only limitations are to be determined from the scope of the appended claims.

I claim as my invention:

1. Control apparatus comprising, in combination, a polycircuit induction device having a polycircuit stator winding, a rotor, and a polycircuit rotor winding, having terminals adapted for connection to a supply of electrical energy said polycircuit stator winding, means for rotating the electrical field of said polycircuit stator winding, locking means normally locking said rotor and being operable to unlock said rotor, a device to be controlled, means for applying a voltage from said polycircuit rotor winding to said device to be controlled to control said device, control means operable to control said device to be controlled, switching means for short circuiting said device to be controlled and for connecting said polycircuit rotor winding to the supply of electrical energy, and means responsive to said control means for actuating said switching means to short circuit said device to be controlled and for connecting said polycircuit rotor winding to the supply of electrical energy and to simultaneously operate said locking means to unlock said rotor.

2. Control apparatus comprising, in combination, a synchro control device having a stator winding, a rotor and a rotor winding, circuit terminals connected with said stator winding adapted for connection to a supply of electrical energy, means for rotating the electrical field of said stator winding, locking means normally locking said rotor and being operable to unlock said rotor, a device to be controlled, circuit means for applying a voltage from said rotor winding to said device to be controlled to control said device, and control means for rendering said rotor winding ineffective to energize said device to be controlled and for connecting said rotor winding to the supply of electrical energy and simultaneously operating said locking means to unlock said rotor.

3. Electrical apparatus for controlling a device to be controlled comprising, in combination, a synchro control unit having a polycircuit stator winding, a rotor and a polycircuit rotor winding, circuit terminals connected with said polycircuit stator winding adapted for connection to a supply of electrical energy, means for rotating the electrical field of said polycircuit stator winding, circuit means for applying a voltage from said polycircuit rotor winding to said device to be controlled to control said device, locking means for locking said rotor, switching means effective when operated to prevent said polycircuit rotor winding from energizing said device to be controlled and connecting said polycircuit rotor winding to the supply of electrical energy, control means for controlling said device to be controlled, and means responsive to said control means, for operating said locking means to unlock said rotor and operating said switching means for connecting said polycircuit rotor winding to the supply of electrical energy.

4. Electrical apparatus for controlling a device to be controlled comprising, in combination, a synchro control unit having a Y connected stator winding, a rotor, and a Y connected rotor winding, circuit connections for applying a supply of electrical energy to said Y connected stator winding, means for rotating the electrical field of the Y connected stator winding, circuit means connecting two windings of said Y connected rotor winding to said device to be controlled to energize said device and effect a control thereof, locking means for locking said rotor and operable to unlock said rotor, switching means for shunting said device to be controlled from said two windings of said Y connected rotor winding and connecting said Y connected rotor winding to the supply of electrical energy, control means operable to control said device to be controlled, and means responsive to said control means for operating said locking means to unlock said rotor and operate said switching means to shunt said device to be controlled and for connecting said Y connected rotor winding to the supply of electrical energy.

5. Electrical apparatus for controlling a body operable in space comprising, in combination, gyroscope means for controlling said body, electromagnetic means for controlling said gyroscope means, piloting means for controlling said electromagnetic means, a synchro control device having a stator winding, a rotor and a rotor winding, circuit connections for applying a supply of electrical energy to said stator winding, means for rotating the electrical field of said stator winding in dependence of a change in position of said body with respect to a reference position of said body, circuit means connecting said rotor means to said electromagnetic means to energize said electromagnetic means, locking means for locking said rotor, switching means for shunting said electromagnetic means from said rotor winding and for connecting said rotor winding to the supply of electrical energy energizing means, and means responsive to said piloting means for operating said locking means to unlock said rotor and operating said switching means to shunt said electromagnetic means from said rotor winding and for connecting said rotor winding to the supply of electrical energy.

6. Electrical apparatus for controlling a body operable in space comprising, in combination, gyroscopic means for controlling said body, electromagnetic means for controlling said gyroscope means, piloting means for controlling said electromagnetic means, a synchro control device having a stator winding system including three distributed windings, a rotor and a rotor winding system including three distributed windings, each of said winding systems being Y connected, circuit connections for applying a supply of electrical energy to the stator winding system, means for rotating the electrical field of the stator winding system, circuit means connecting at least one of said rotor windings to said electromagnetic means to energize said electromagnetic means, locking means for locking said rotor against rotation, switching means for rendering said one winding of said rotor winding ineffective to energize said electromagnetic means and for connecting said rotor winding to the supply of electrical energy, and means responsive to said piloting means for operating said locking means to unlock said rotor and operating said switching means for connecting said rotor winding to the supply of electrical energy.

7. Electrical apparatus for controlling a body operable in space comprising, in combination, gyroscopic means for controlling said body, electromagnetic means for controlling said gyroscope means, piloting means for controlling said electromagnetic means, a synchro control device having a three phase stator winding, a rotor and a three phase rotor winding, each of said windings being Y connected, circuit connections for applying a supply of electrical energy to the three phase stator winding, means for rotating the electrical field of the stator winding, circuit means connecting two phases of said rotor winding to energize said electromagnetic means, locking means for locking said rotor against rotation and being operable to unlock said rotor, switching means occupying a normally open position when said rotor is locked by said locking means and being operable to shunt said electromagnetic means from said two phases of said rotor winding forming a common circuit for said two phases to one side of the supply of electrical energy and for connecting the third phase of said rotor winding to the other side of the supply of electrical energy, and means responsive to said piloting means for simultaneously operating said locking means and said switching means.

8. Apparatus for controlling the course of a craft operable in space comprising, in combination, gyroscope means responsive to the angular velocity of said craft in azimuth for controlling said craft, electromagnetic means for controlling said gyroscope means, a synchro control unit having a three phase stator winding, a rotor and a three phase rotor winding, circuit connections for applying a supply of electrical energy to said three phase stator winding, means responsive to the angular error in course of said aircraft with respect to a fixed angular course for rotating the electrical field of said stator winding, and circuit means connecting two phases of said three phase rotor winding to said electromagnetic means to energize said electromagnetic means and control said gyroscope means.

9. Apparatus for controlling the course of a craft operable in space comprising, in combination, gyroscope means responsive to the angular velocity of said craft in azimuth for controlling said craft, electromagnetic means for controlling said gyroscope means, piloting means operable to control said electromagnetic means, a synchro control unit having a three phase stator winding, a rotor and a three phase rotor winding, circuit connections for applying a supply of electrical energy to said three phase stator winding, circuit means connecting two phases of said rotor winding to said electromagnetic means, a brake for controlling said rotor, switching means for connecting said two phases together to one side of the supply of electrical energy and for connecting the third phase to the other side of said energizing means, means interlocking said brake and said switching means to open said switching means when said brake engages said rotor and to close said swtiching means when said brake is in disengaged position, and means responsive to said piloting means for biasing said brake to engage said rotor.

10. Apparatus for controlling the course of a craft operable in space, comprising, in combination, gyroscope means responsive to the velocity of angular motion of said craft in azimuth for controlling said craft, electromagnetic means for controlling said gyroscope means, a synchro control unit having a three phase stator winding, a rotor and a three phase rotor winding, a synchro transmitter having a three phase stator winding, a rotor and a single phase rotor winding, circuit means connecting both said three phase stator windings, circuit means connecting two phases of said three phase rotor winding to said electromagnetic means, circuit connections for applying a supply of electrical energy to said single phase rotor winding, and means for driving said rotor of said synchro transmitter in dependence of the error in course of said craft with respect to a fixed course.

11. Apparatus as set forth in claim 10 in which said last named means comprises a directional gyroscope, and means connecting said gyroscope to drive said rotor of said synchro transmitter.

12. Apparatus as set forth in claim 10 in which said last named means comprises an electromagnetic means for producing electrical signals in dependence of the orientation thereof in the earth's magnetic field, a directional gyroscope having freedom of angular movement about axes extending substantially transversely and vertically, respectively, of the craft and having the spin axis thereof substantially paralleling the longitudinal axis of said craft, electromagnetic means responsive to said electrical signals for biasing said directional gyroscope about said transverse axis of freedom, and means responsive to the precessional motion of said gyroscope about said vertical axis for driving the rotor of said synchro transmitter.

13. Apparatus for controlling the course of a craft operable in space comprising, in combination, gyroscopic means responsive to the velocity of angular movement of said craft in azimuth for controlling said craft, electromagnetic means for controlling said gyroscope means, a synchro control unit having a three phase stator winding, a rotor and a three phase rotor winding, a synchro transmitter having a three phase stator winding, a rotor and a single phase rotor winding, circuit means connecting both said three phase stator windings, circuit means connecting two phases of said three phase rotor winding to said electromagnetic means, circuit connections for applying a supply of electrical energy to said single phase rotor winding, means for driving said rotor of said synchro transmitter in dependence of the error in course of said craft with respect to a fixed course, a brake locking said rotor of said synchro control unit, piloting means for controlling said electromagnetic means, and means responsive to said piloting means for substantially simultaneously connecting said two phases to one side of said supply of electrical energy, connecting the third phase of said rotor winding to the other side of said supply of electrical energy and for operating said brake to release said rotor of said synchro control unit.

14. Apparatus as set forth in claim 13 in which said means for driving said rotor of said synchro transmitter comprises a directional gyroscope, and means connecting said gyroscope to drive said rotor of said synchro transmitter.

15. Apparatus as set forth in claim 13 in which said means for driving said rotor of said synchro transmitter comprises an electromagnetic means for producing electrical signals in dependence of the angular position thereof in the earth's magnetic field, a directional gyroscope having two degrees of freedom, said directional gyroscope being disposed on said craft to detect errors in course thereof, electromagnetic means responsive to said electrical signals for biasing said directional gyroscope in one of said two degrees of freedom, and means responsive to precessional movement of said directional gyroscope in the second of said two degrees of freedom for driving said rotor of said synchro transmitter.

16. In a control for an aircraft, the combination of, turn control means, bank control means and pitch control means, means responsive to said turn control means for controlling said bank control means, piloting means for controlling said turn control means and said pitch control means, a synchro control unit having a stator winding, a rotor and a rotor winding, circuit means for applying a supply of electrical energy to said stator winding, means for rotating the electrical field of said stator winding in dependence of the angular error in course of said aircraft with respect to a predetermined course, means responsive to the electrical output of said rotor winding for controlling said turn control means, and means responsive to said piloting means for rendering the electrical output of said rotor winding ineffective to control said turn control means and for connecting said rotor winding to the supply of electrical energy.

17. In a control for an aircraft, the combination of, turn control means, bank control means and pitch control means, means responsive to said turn control means for controlling said bank control means, piloting means for controlling said turn control means and said pitch control means, a synchro control unit having a three phase stator winding, a rotor and a three phase rotor winding, circuit connections for applying a supply of electrical energy to said stator winding, means responsive to errors in course of said aircraft with respect to a fixed course for rotating the electrical field of said stator winding, circuit means responsive to the voltage of two phases of said rotor winding for controlling said turn control means, a brake operable to two positions engaging and releasing said rotor, switching means operable in closed position to connect said two phases together to one side of the supply of electrical energy and to connect the third phase of said rotor winding to the other side of the supply of electrical energy, interlock means connecting said brake and said switching means to close said switching means when said brake is in released position and opening said switching means when said brake is in engaged position, means biasing said brake to released position, electromagnetic means biasing said brake to engaged position, and means for energizing said electromagnetic means when said piloting means is in operation and for deenergizing said electromagnetic means when said piloting means is actuated.

18. Control apparatus for an electrical device to be controlled comprising, in combination, a synchro control unit having a three phase stator winding, a rotor and a three phase rotor winding, said three phase stator winding having terminals adapted for connection to a supply of electrical energy, control means for rotating the electrical field of said stator winding, means for preventing rotation of said rotor, and circuit means connecting two phases of said three phase rotor winding to said electrical device to supply electrical energy to said electrical device.

19. In a flight controller for dirigible craft, the combination of, a movable control member for controlling the craft, an inductive device having a stator, a three-phase stator winding, a rotor and a three-phase rotor winding; input conductors on said three-phase stator winding providing for the application of a course indicating alternating current electrical signal to said stator winding, switch means movable between open and closed positions, said switch means in said closed position connecting said three-phase rotor winding to a supply of alternating current, and switch control means responsive to movement of said control member from a given position for effecting closing of said switch means.

20. In a flight controller for a dirigible craft, the combination of, a movable control member for controlling the craft, an inductive device having, a stator, a three-phase stator winding, a rotor and a three-phase rotor winding; input conductors on said three-phase stator winding providing for the application of a course indicating alternating current electrical signal to said stator winding, an impedance device having input conductors for connection to a supply of alternating current, switch means operable when closed to connect two phases of said three-phase rotor winding to a common point on said impedance device and to connect the third phase of said rotor winding to another point on said impedance device, and switch control means responsive to movement of said control member from a given position for effecting closing of said switch means.

21. In a flight controller for dirigible craft, the combination of, a movable control member for controlling the craft, an inductive device having a stator, a three-phase stator winding, a rotor and a three-phase rotor winding; input conductors on said three-phase stator winding providing for the application of a course indicating alternating current electrical signal to said stator winding, switch means for connecting said three-phase rotor winding to a supply of alternating current, brake means for controlling rotative movement of said rotor, and means operable when said control member is in a given position to apply said brake means and open said switch means and operable when said control member is moved from said given position to release said brake means and to close said switch means.

22. In a flight controller for a dirigible craft, the combination of, a movable control member for controlling the craft, an inductive device having, a stator, a three-phase stator winding, a rotor and a three-phase rotor winding; input conductors on said three-phase stator winding providing for the application of a course indicating alternating current electrical signal to said stator winding, an impedance device having input conductors for connection to a supply of alternating current, switch means operable when closed to connect two phases of said three-phase rotor winding to a common point on said impedance device and to connect the third phase of said rotor winding to another point on said impedance device, brake means for controlling rotative movement of said rotor, and means operable when said control member is in a given position to apply said brake means and open said switch means and operable when said control member is moved from said given position to release said brake means and close said switch means.

GEORGE R. DOUGLAS.

REFERENCES CITED

The following references are of record in the file of this patent:

UNITED STATES PATENTS

| Number | Name | Date |
| --- | --- | --- |
| 1,637,039 | Hewlett et al. | July 26, 1927 |
| 1,937,375 | Woodward | Nov. 28, 1933 |
| 2,415,429 | Kellogg et al. | Feb. 11, 1947 |
| 2,415,430 | Frische et al. | Feb. 11, 1947 |
| 2,416,097 | Hansen et al. | Feb. 18, 1947 |
| 2,464,629 | Young | Mar. 15, 1949 |
| 2,471,821 | Kutzler | May 31, 1949 |
| 2,516,641 | Murphy | July 25, 1950 |
| 2,516,796 | Noxon et al. | July 25, 1950 |
| 2,553,597 | Maroni | May 22, 1951 |

FOREIGN PATENTS

| Number | Country | Date |
| --- | --- | --- |
| 384,158 | Great Britain | Dec. 1, 1932 |